United States Patent

[11] 3,615,235

| | | |
|---|---|---|
| [72] | Inventor | Jiri Hrdina |
| | | Praha, Czechoslovakia |
| [21] | Appl. No. | 765,830 |
| [22] | Filed | Oct. 8, 1968 |
| [45] | Patented | Oct. 26, 1971 |
| [73] | Assignee | Ceskoslovenska akademie ved |
| | | Praha, Czechoslovakia |
| [32] | Priority | Oct. 9, 1967 |
| [33] | | Czechoslovakia |
| [31] | | 7129-67 |

[54] THROUGH-FLOW REACTOR
9 Claims, 10 Drawing Figs.

[52] U.S. Cl................................................. 23/253 R,
23/230·B, 73/61.1, 165/179, 210/198 C
[51] Int. Cl......................................................G01n 31/22,
G01n 31/08, G01n 33/16
[50] Field of Search............................................ 23/230,
232, 253; 73/611; 210/316, 198 C; 138/38;
165/179

[56] References Cited
UNITED STATES PATENTS

| | | | |
|---|---|---|---|
| 2,946,665 | 7/1960 | Skeggs.......................... | 23/230 |
| 3,010,798 | 11/1961 | Whitehead et al............ | 23/230 |
| 3,074,784 | 1/1963 | Ferrari......................... | 23/253 |
| 3,285,701 | 11/1966 | Robertson..................... | 23/230 X |
| 3,298,527 | 1/1967 | Wright.......................... | 210/198 C |
| 3,468,764 | 9/1969 | Cohen et al................... | 23/253 X |
| 3,474,908 | 10/1969 | Catravas....................... | 210/198 C |

Primary Examiner—Morris O. Wolk
Assistant Examiner—D. G. Conlin
Attorney—Paul H. Smolka ABSTRACT: A through-flow reactor which forms a part of an analyzer of substances such as amino acids delivered from a chromatographic column where they have been divided into zones having sharp concentration gradients. The reactor includes a tubular body having an inlet end and an outlet end, the tubular body containing a porous packing material, the inlet end of the tubular body housing a porous body above and bearing on the porous packing material and separating the source of the substances undergoing analysis from the porous packing material of the reactor and the outlet end housing a porous body below and bearing on the porous packing material, the porous packing material and each porous body being nonchemically reactive with the substances flowing through the reactor. This reactor construction reduces distortion of the concentration gradients as they pass through the reactor.

THROUGH-FLOW REACTOR

The present invention relates to a through-flow reactor, and more particularly a reactor for performing a chemical reaction between at least one liquid delivered from a chromatographic column, and reagents supplied into said liquid at the boundary between said column and said reactor, while keeping concentration gradients of individual zones of the supplied liquid in such a condition to enable said liquid zones to be evaluated after having left the reactor.

In many modern arrangements, particularly in modern fully automated analyzers for substances such as amino acids, it is conventional to perform one or more reactions in a liquid stream carrying individual substances in the form of concentration zones in order to get a required analytical or preparative effect.

As is known, the first step of operation made in such analyzers consists in a chromatographic separation of a mixture of amino acids or like substances into individual components in a chromatographic column. The elution liquid stream, or effluent is delivered from the column through a capillary tube and carries the individual chromatographically separated components such as various amino acids, one after another in the form of concentration zones. Each of these zones contains, or should contain, but a single component, the concentration of the particular component on leaving the column corresponding substantially to the Gaussian distribution curve.

To be able to determine the concentrations of said individual components by means of a standard method, such as, for instance a colorimetric one, it is necessary to subject all the individually separated components to a suitable chemical reaction, usually brought about in a reactor to a sufficiently high degree as required for said quantitative evaluation, in order that they may yield proportional quantities or concentrations of an as uniform a dyestuff or the like as possible. As it is well known, a color-forming ninhydrine reaction is used, as a rule, to carry out such a colorimetric evaluation of amino acids and like substances. To bring about this reaction to such a stage, wherein it offers the possibility of a quantitative evaluation, it is necessary to mix the effluent, just after having left the column, homogeneously with a reagent containing ninhydrine and hydridantine.

It is already known that an essential feature of such a reactor forming part of an automated amino acid analyzer, is a relatively long and thin capillary tube made, e.g., from polytetrafluoroethylene (TEFLON, Reg. Trade Mark), of which the inner diameter is less than 1 millimeter while its length amounts to some tens of meters. In operation, such a capillary tube is immersed into a bath having a temperature of 100° C. The reaction, if considering normally used through-flow parameters, proceeds at the temperature of 100° C., for a period of 15 minutes.

The aforementioned form of a reactor as well as other through-flow reactor types provide similar reaction conditions, in order that the depreciation of chromatographically accomplished separation of individual components from one another be as small as possible. With each of the aforesaid reactor types, however, such depreciation occurs always to an extent, due to intermixing or reducing the sharpness of the concentration gradients. This depreciation may be termed "distortion" (blurring) of concentration gradients or of concentration zones. To mitigate this undesirable effect, it has been proposed, especially with modern analyzers operating at a relatively speed, to reduce the diameter and, on the other hand, to increase the length of the reaction capillary tube. Nevertheless, this improvement requires the enhancement of the pressures necessary to cause the flow, regardless of the likelihood of the capillary tube of being choked with any contaminants as well as of the sensitivity thereof to the presence of undesirable barring bubbles or the like. Another well-known and highly effective method to reduce the undesirable effect of the so-called zone washing-out consists in splitting the liquid stream in the capillary tube lengthwise into individual liquid sections separated from one another by means of the so-called "bubble pistons." This method, which has successfully been utilized not only with amino acid analyzers but also for other analytical purposes where the first requirement is the perfect separation of particular samples or zones carried along with liquid stream, as possible is the first-rate requirement, enables, it is true, the sharpness of the concentration gradients to be prevented to a great extent from being reduced, in comparison with the "bubble-free" method, but yet it constitutes one of the principal factors limiting the efficiency of the analyzers even in the case of using such a system wherein the liquid does not substantially wet the inner wall of the reactor capillary tube.

The purpose of the present invention and the basic object of the same is to overcome the aforementioned disadvantages and to significantly improve the through-flow reactor.

SUMMARY OF THE INVENTION

In accordance with my invention I provide a through-flow reactor for carrying out a chemical reaction between at least one liquid delivered from a chromatographic column and reagents supplied into said liquid at the boundary between said column and said reactor, while keeping concentration gradients of individual zones of the supplied liquid in such a condition to enable said liquid zones to be evaluated after having left the reactor.

The through-flow reactor according to the invention includes a reacting tube filled up uniformly with a porous or loose material, such as crushed or, preferably, spheroidal particles of inert substances, as e.g. glass, polytetrafluoroethylene or the like. Alternately, there may also be used substances having catalytic or sorption effects on the reacting components. The reactor need not have capillary dimension, and consequently it can be, in view of current conditions of operation on amino acid analyzers, very short, say, 20 centimeters.

To promote the course of the reaction, the reactor comprises a heat-insulating jacket communicating with a suitable source of energy, such as a resistor-type heat-generating element, or alternately, it can be made of an electrically conductive material and connected directly at two different portions thereof to a source of power.

Furthermore, in order to prevent the liquid content of the reacting tube from boiling if using reaction temperatures surpassing the boiling point of the respective liquid, it is necessary that the reacting space be connected to a manostatic device to maintain said space under a superatmospheric pressure which should be slightly higher than that of the vapors of said liquid.

At its upper end the inner space of the reacting tube is cut off from the space of the chromatographic column by means of a seal consisting of a resilient annular member carrying in its center an insert of a porous sheet; said member is provided even in the case wherein the tube, according to a modified embodiment of the invention, is integral with the chromatographic column.

A central bore is provided in the resilient member and the eluate from the column is supplied therethrough. The central bore communicates laterally with at least one feed means for supplying the reagents thereinto.

It is to be understood that a similar seal is provided at the opposite or outlet end of the reacting tube.

The features which are considered characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
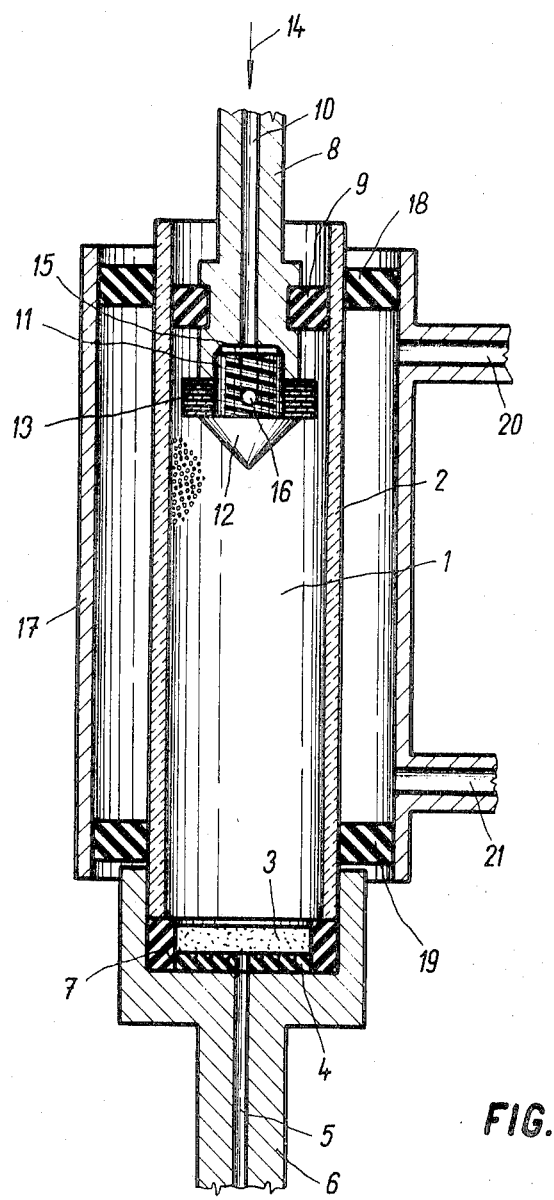
FIG. 1 is a longitudinal sectional view of one embodiment of the through-flow reactor according to the present invention.

Discussing now the drawings in detail, and firstly FIG. 1 thereof, it will be seen that it shows, by way of example, one of possible embodiments of the through-flow reactor according to the invention, of which various constructional modifications may correspond to numerous types of the chromatographic columns already known. The inner space 1 of a reactor tube 2 made for example of glass, is totally filled up with a porous or loose material, such as, for instance, glass beads having uniform diameter of, say, 20 microns. The lower seal arrangement of the reactor, more particularly of the operating inner space 1 thereof, comprises a disc 3 of a porous material, such as, for example, sintered glass, of which pores should be of a smaller diameter than that of grains forming said packing in the inner reactor space 1. Just below the porous disc 3 there is arranged another disc 4, made e.g. from polytetrafluoroethylene (TEFLON), the surface of which is provided with fine grooves which open into a central aperture through which the inner space 1 of the reactor tube 2 communicates with an outlet duct 5 provided in a lower seal body 6. In a recess in said seal body 6 there is inserted a ring 7 of e.g. silicon rubber which is pushed by the body 6 against the lower edge of the reactor tube 2, forming thus a gasket preventing the leakage of all aforesaid parts 2, 3, 4 and 6.

The opposite or upper seal arrangement of the reactor tube 2 is embodied analogously as the lower one. In a circumferential groove provided in an upper seal body 8 there is received an elastic ring 9 serving for tightening of the upper seal body 8 in the top portion of the reactor tube 2, said body 8 being also centrally bored to form an inlet duct 10 discharging into a thread 11 in which a bolt 12 is loosely screwed. In other words, the outer diameter of the bolt 12 is smaller than the inner diameter of the thread 11 to provide a passage therebetween. Between the head of the bolt 12 and the inner surface of said body 8 there is slightly gripped an annular porous body 13 constituted preferably by one or more layered sheets of filter paper, porous TEFLON plates and the like.

A liquid supplied into the inlet duct 10 in the direction of an arrow 14, flows either over the loose thread 11 of the bolt 12, or through a central duct 15 designated in FIG. 1 by dashed line, which duct 15 discharges into a cross-channel 16, as can be seen adjacent the bolt 12. The liquid flows further through the porous annular body 13 radially, and due to the hydraulic resistance prevailing in the latter, it is distributed uniformly around the circumference of the head of the bolt 12. As hereinbefore set forth, the whole space 1 of the reactor tube 2 is filled up with a loose, freely penetrable material, such as glass beads or chips. This packing surrounds even the circumference of the porous annular body 13 from which the liquid flows uniformly downwards into said loose packing in the inner space 1 and penetrates in the downward direction therethrough. Due to a suitable, e.g. conical shape of the head of the bolt 12 it is possible to attain an optimalization of the form of the so-called concentration wave-surfaces or wave-fronts of particular substances to be examined, which substances penetrate said packing in the inner space in such a way that through the central outlet duct 5 of the lower seal body 6 there are delivered substances carried by the liquid stream in form of zones having the steepest concentration gradients.

As results from the knowledge of laws of column chromatography on capillary columns, or columns filled up with loose materials, a certain arrangement of the reactor, as for instance in accordance with FIG. 1, enables, even in the case of a considerable increase of the inner space diameter up to several millimeters to obtain a substantially reduced depreciation or diminishment of the concentration gradients, when compared with the conventional capillary reactors comprising extremely long capillary tubes of which diameter is but several tenths of a millimeter. Furthermore, even with a relatively short length of the reactor tube 2, such as e.g. 0.2 m. there can be obtained, with given liquid through-flow parameters, reaction periods corresponding to those obtained on well-known capillary reactor of which capillary reacting spaces have a length amounting to several meters, or even tens of meters. Moreover the reactor according to the invention enables the necessary reaction temperature to be attained by various means known per se. Thus for example, as shown in FIG. 1 the heating of the reactor tube 2 can be cared for by means of an outer jacket 17 tightened relative to the tube 2 by upper an lower stoppers 18 and 19, respectively, and connected via necks 20 and 21 to a conventional heat-recirculating thermostat. The reactor tube 2 can be heated by utilizing a great number of various heating systems known per se, such as for instance by heat generated by energizing a resistive heating element. Such an element may be either the reactor tube 2 itself, or a resistive wire coiled helically therearound.

It is a well-known fact that the speed of various reactions is directly proportional to a temperature rise, increasing 2 to 5 times by every 10° C. By utilizing said knowledge known per se it is possible to shorten substantially the required reaction course, and consequently to reduce the dimension of the reactor. Moreover, it is possible to attain in this way another important improvement, i.e., the reduction of the undesirable effect of zone or gradient washing-out or distortion, and finally to reduce the pressures necessary for causing the passage of the liquid through the reactor, due both to the shorter length of the reactor tube 2, and to the viscosity grade drop resulting from the utilization of elevated temperatures.

The reactor according to the present invention is preferably operated at temperatures below the boiling point of the liquid to be analyzed, but may also, be operated at temperatures considerably above said point in the reactor. In the latter case, however, the abullition of the liquid in the reactor should be prevented under an elevated liquid pressure produced by means of a suitable and well-known manostatic device of any kind. The pressure has to be slightly higher than that of the liquid vapors at the respective temperature.

Figures 2, 3:
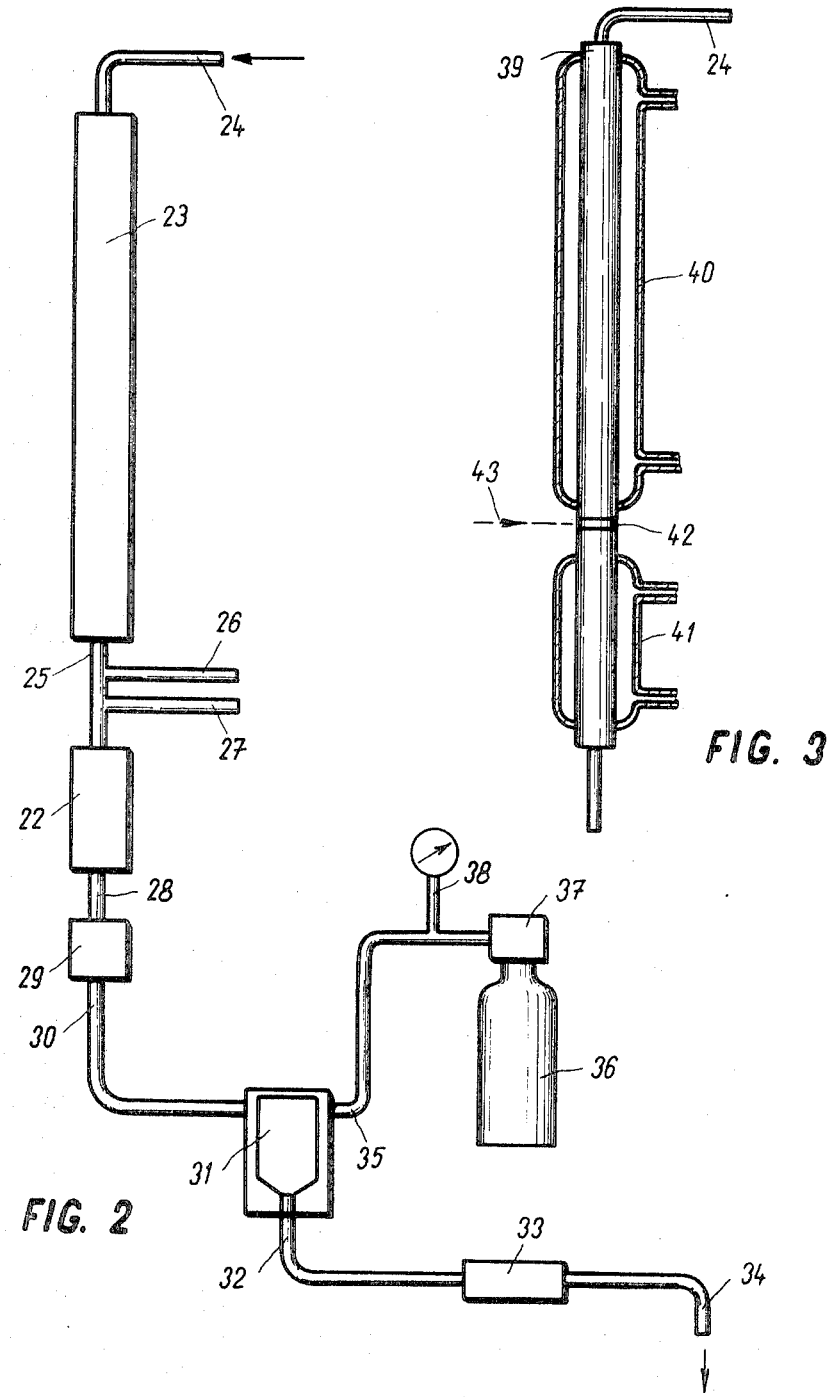
FIG. 2 is a schematic total view of the entire analyzing assembly, showing the interconnection of the reactor thereinto.
FIG. 3 shows an example of mechanical coupling of the chromatographic column and the through-flow reactor to form an integral unit.

Referring now to FIG. 2, it may be seen that it shows somewhat schematically one mode of the connection of the reactor into the complete analyzing unit for examining automatically amino acids. The reactor shown in FIG. 2 as a plain rectangle is designated by reference numeral 22. A mixture of substances to be analyzed is chromatographically separated when passing downwards through the chromatographic column 23, by streaming action of an elution liquid (i.e. eluent) supplied thereinto via pipe 24 in the direction of the arrow. The eluate delivered out of a pipe 25 from the lower portion of the column 23 is intermixed with one or two reagents supplied through pipelines 26 and/or 27 and enters the reactor 22. After the reaction in the reactor 22, the liquid carrying the concentration zones of the individual substances converted to quantities of a standard dyestuff proportional thereto, is discharged via pipeline 28 into a through-flow photometer 29. Therefrom it flows away into a nonpressurized waste receptacle; alternatively this waste receptacle can be kept under superatmospheric pressure.

The latter can be produced, for instance, by collecting the waster liquid in a hydrostatically pressurized flask, or by driving said liquid through mercury column in accordance with the wellknown manostatic method, and the like. Neither of the hereinbefore said modes are shown in schematic FIG. 2.

However, in the bottom part of FIG. 2 there is shown an arrangement which has a collecting space of minimum capacity enabling practically unlimited amounts of the liquid to be received therein. Another advantage possessed by the arrangement shown is an independence from pressure variation of a gas due to changes in ambient temperature. A third advantage is that the arrangement may be used in certain devices wherein one or more peristaltic type pumps are used.

The liquid discharged from the photometer 29 is led into a closed collecting space 31. Therefrom it is let off via pipeline 32 over a pump 33, such as, for example, of peristaltic type, through pipeline 34 into an open waste tank. In order to avoid the necessity of caring for a very precise synchronization of pumps causing the flow of the liquid through pipelines 24, 26 and 27, with the pump 33, to safeguard the required pressure in the reactor and in the column 23, it is recommended to maintain the pressure in the space 31 by means of a suitable manostat. A conventional method of manostatization is suggested schematically in FIG. 2, consisting in that the space 31 is fed with a constant gaseous or liquid flow e.g. from a storage flask 36, passing via pipeline 35 over a conventional manostatic device 37. The pressure in the collecting space 31 and consequently in the reactor 22 is controlled by a manometer 38. A source of this additional amount of liquid or gas can be constituted, instead of said storage flask, for instance by another member of a multiple peristaltic pump.

Other members of said pump can be designed, as it is known per se, to care for the streaming of one or more reagents supplied via pipelines 26 and 27.

It is to be understood that all parts of the arrangement subject to the pressures provoked by the zones in the form of concentration zones carried by the liquid should be constructed in such a way as to impair the concentration gradients as little as possible. This requirement has to be attended to not only with the reactor, as hereinbefore set forth, but also with the column 23, the photometer 29 and the connecting pipelines 25 and 28. The last-mentioned pipelines should accordingly be made as short and have as small an inner diameter as possible; if a larger diameter is used, it may be advisable to fill them up with minute particles.

An embodiment of mechanical connection of the chromatographic column to the reactor according to the invention is shown schematically in FIG. 3. The upper part of the tube 39 which forms both the column and the reactor, is filled up with a chromatographically active loose material, such as, for instance, a cation exchanger, and heated by means of a jacket 40 to a temperature necessary for the chromatographic separating process. On the other hand, the lower part of the tube 39 acting as a reactor is filled up with the like packing and received in a jacket 41 which provides the temperature required to promote the reaction. The two said packings are in mechanical contact with each other, or form an intermediate layer 42, wherein both said materials penetrate each other uniformly.

It is, namely, preferable if both the lower seal arrangement of the chromatographic column and the upper seal arrangement of the reactor are omitted, since the undesirable effects of these parts to the washing-out of the zones can be reduced. After the lower reactor tube portion has been filled up and the sedimentation finished, the upper part of the tube can also be filled up immediately, particularly if the size of the packing particles in both said parts is approximately alike.

The aforesaid intermediate layer 42 can be formed likewise by a porous or loose packing prepared from various materials, such as, for example, a sheet or filter paper, or a plate of porous polytetrafluoroethylene (TEFLON), or alternately a plurality of such superposed sheets, or a thicker porous stopper made from such materials, and the like. Into said intermediate layer 42 there may eventually be discharged laterally a pipeline 43 for supplying the reagent liquid.

Furthermore, a sufficient homogenization of the liquids reacting with each other must be provided. This can be attained to a considerable extent automatically by connecting inlets of the liquid streams, or the upper parts of the reactor.

Figure 4:
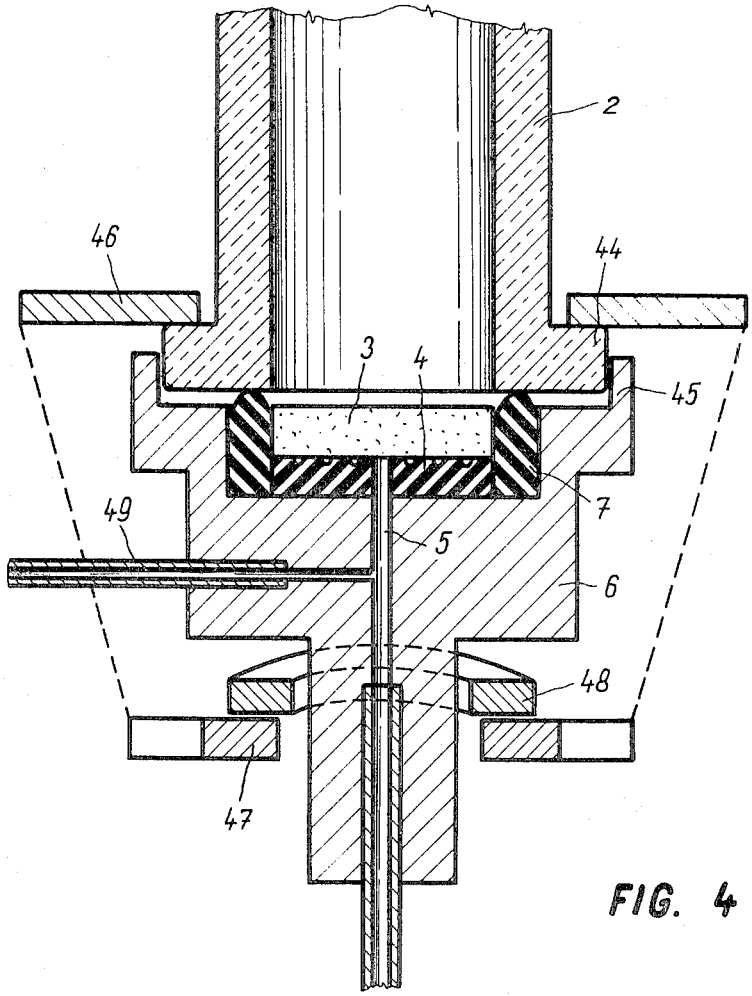
FIG. 4 is a detail view of an embodiment of the lower seal arrangement of the reactor.

An example of the lower seal arrangement for the reactor tube is shown in FIG. 4 in detail. This arrangement can be used in cases, wherein the lower portion of the reaction tube is terminated in a flange 44. The general arrangement corresponds substantially to that described with reference to FIG. 1, except that the lower seal body 6 is embodied in this case as having an upwardly extending annular edge 45 which serves for centering the seal body relative to the reactor tube 2. The leakless connection of the two said parts 2 and 6 together with the interposed elastic ring 7 is cared for by a conventional joint gripper comprising, as schematically shown in FIG. 4, an upper jaw 46 and a lower jaw 47. The latter should not, preferably, bear against the seal body 6 directly, but by the intermediary of a slightly undulated or curved ring 48 (having four projections and four alternating depressions) the configuration of which may guarantee that even in case of an eventually skew position of the lower jaw 47 the resultant of the pressure exerted acts axially respective to the seal body 6 or to the reactor tube 2. A double-curved ring 48 will act as a simple mechanical replacement of the universal (Cardan) joint.

Figure 5:
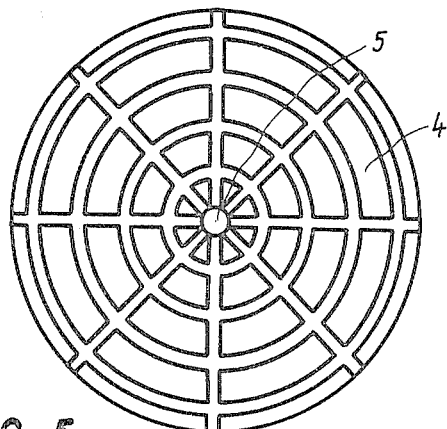
FIG. 5 is a detail view of a part derived from FIG. 4.

The lateral feed duct 49, as shown in FIG. 4, suggest a possibility of supplying a medium producing bubble pistons designed for separating the liquid stream discharged from the tube 2 into lengthwise sections; alternately, said duct or a similar one may serve to supply one or more reagents into the central duct 5 just below the porous disc 3 or plate 4 provided with grooves on its surface. The form or these both radial and circumferential grooves is schematically shown in FIG. 5. Instead of said grooves, the surface of said plate 4 can simply be ragged in order to provide communication of minute spaces between the porous disc and the plate 4 with the central outlet duct 5. It is to be understood that the total capacity of said grooves or ragged spaces is negligible relative to the dimension of the disc 3. On the other hand, the total through-flow cross-sectional area of said capacity or its hydraulic resistance is in turn negligible relative to the size of the pores in the disc 3, or to the flow resistance of the latter. On principle, it is necessary that the local liquid flow be determined almost exclusively by hydraulic resistances caused by penetrating the pores of the disc 3; moreover a time period necessary for a particle to cover the distance from the circumference of the disc 3 or plate 4 therebetween up to the central duct 5, relative to a particle passing along the axis of the porous disc 3 should be negligible; likewise negligible should be the difference between the two time periods relative to the time needed by the concentration zone of a substance to pass through the porous disc 3.

Figure 6:
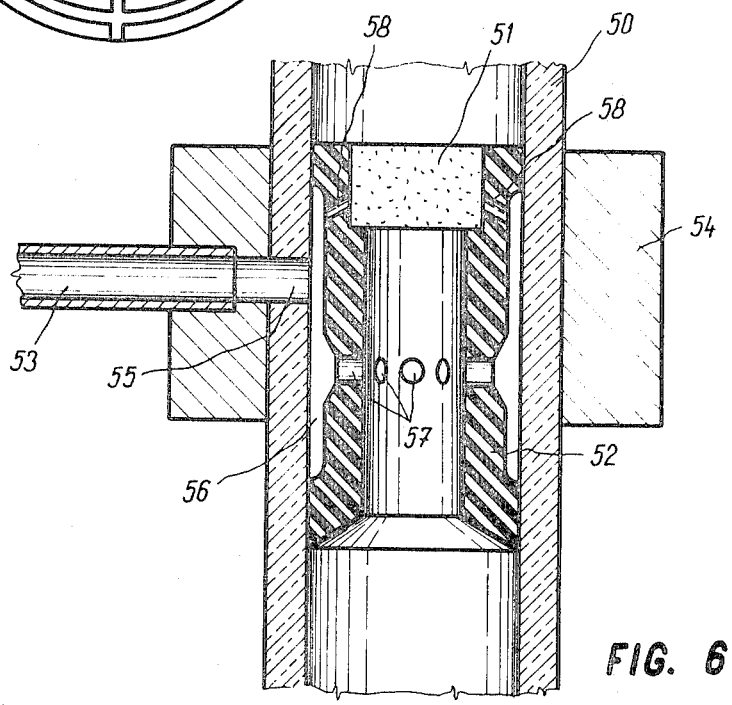
FIG. 6 is a longitudinal sectional view of a reactor embodiment, wherein the chromatographic column and the through-flow reactor form together one integral tubular unit.

As shown in FIG. 6, both the chromatographic column and the reactor consist of a single tube designated by the reference numeral 50. In this embodiment the intermediate layer is constituted by a porous body 51 made e.g. from sintered glass or porous polytetrafluoroethylene (TEFLON) plate, which body is forced into an elastic tubular member or sleeve 52 made, for instance, from silicon rubber. Further in this embodiment the reagent is supplied laterally through a hollow needle 53 inserted into an annular body 54 surrounding externally the tube 50 and cemented thereto by a resin, epoxy-resin, or the like. The channel provided in the needle 53 communicates with an aperture 55 bored in the tube wall as well as with an annular space 56 left between a circumferential recess in the sleeve 52 and said wall of the tube 50. From this annular space 56 the reagent enters the space under the porous body 51 either via several openings 57 or several radial channels 58 provided in the sleeve 52 and penetrates into the porous body 51. Although the elastic tubular member or sleeve 52 is arranged tightly in the interior of the tube 50, it is given a certain axial play enabling it to be accommodated to the loose packings both in the upper and in the lower tube parts. Nevertheless, this axial tolerance has not, of course, to interfere with the aforementioned communication between the aperture 55 and the space 56. In the next FIGS. 7, 8, 9 and 10 there are shown schematically some other preferable embodiments of the present invention, wherein the column and the reactor tubes communicate with each other, it is true—that means that the liquid is not led through external connecting capillary tubes or the like—but each of said tubes constitutes a separate part, being made from different materials and having also different dimensions.

Figure 7:
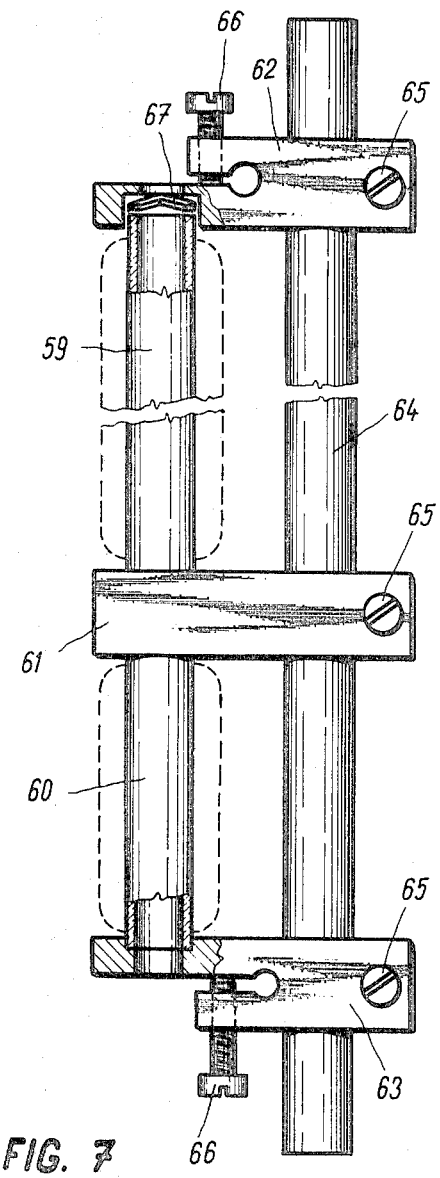
FIG. 7 is a schematic view showing support means for both the chromatographic column and the through-flow reactor.

FIG. 7 shows schematically and by way of example one embodiment of the arrangement of support means for both the column tube 59 and the reactor tube 60. Each tube is provided with a separate thermostatizing jacket shown in dashed line. Said support means comprise a supporting pillar 64 carrying three brackets, i.e. intermediate bracket 61, upper bracket 62 and lower bracket 63, which are adjustably secured thereon. Both the column tube 59 and the reactor tube 60 bear against the intermediate bracket 61 and are pressed thereto by means of the two brackets 62 and 63, respectively. Some embodiments of coupling the two tubes 59 and 60 to each other, not shown in FIG. 7, can be seen in detail in further FIGS. 8, 9 and 10. As hereinbefore set forth, the brackets 61, 62 and 63 are adjustably secured thereon, as for instance by means of bolts 65, a fine adjustment of the pressure against the intermediate bracket 61 in axial direction being cared for by set screws 66. A double-curved ring 67 adjacent the upper bracket 62, acting as a replacement of the universal (Cardan) joint, serves for axially aligning the tube 59 even in such cases, wherein the trust exerted upon its upper face in the recess provided in the bracket 62 is not strictly axial, and wherein said face and the bottom of said recess are not either parallel or even planar.

Figure 8:
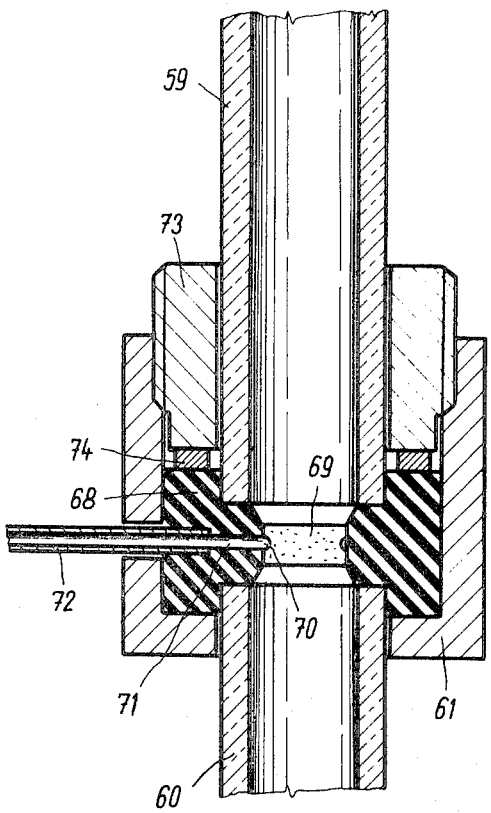
FIG. 8 shows still another embodiment of attachment of the two tubes to each other.

In FIG. 8 one embodiment of constructional connection of the tubes 59 and 60 to each other within said intermediate bracket 61, is shown. The two tubes bear from above and from below, respectively, against an elastic ring 68 surrounding a plate 69 made from a porous material, which plate is provided with a circumferential shallow groove 70 into which a channel 71 or a hollow needle 72 for lateral reagent supply discharge. In axial direction the elastic ring 68 is gripped and resiliently deformed by means of a threaded sleeve 73 pressing against the ring 68 by the intermediary of a washer 74.

Figure 9:
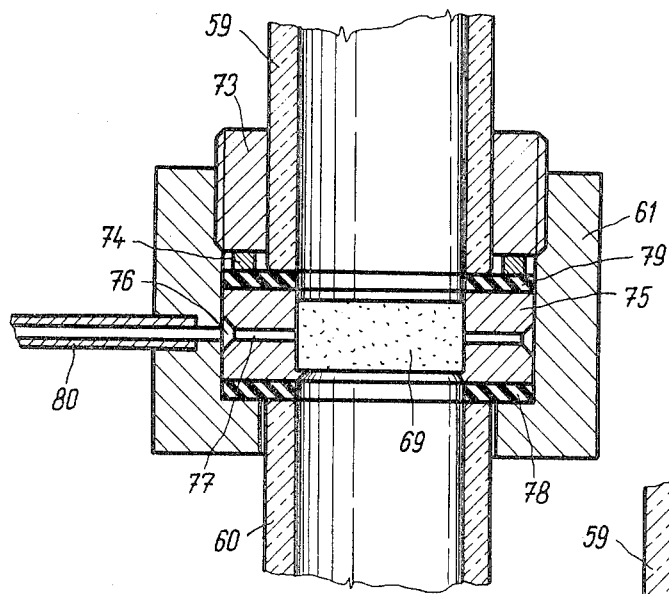
FIG. 9 is a longitudinal view of another embodiment of the coupling between the two tubes.

Another embodiment of the constructional connection between the two tubes 59 and 60 within the bracket 61 is shown in FIG. 9. The porous plate 69 is to be made in this case of porous polytetrafluoroethylene (TEFLON) and tightened previously by being inserted into a solid collar (75). This collar 75 is provided with a circumferential groove 76 communicating via a plurality of radial channels 77 with the circumference of the porous plate 69. Elastic washers 78 and 79 made e.g. from silicon rubber act as tightening means; the leakless connection is cared for, on the one hand, by pressing the two tubes 59 and 60 against each other, and on the other hand, by the thrust of the threaded sleeve 73 over the washer 74. A hollow needle 80 passing the intermediate bracket 61 communicates with the groove 76.

Figure 10:
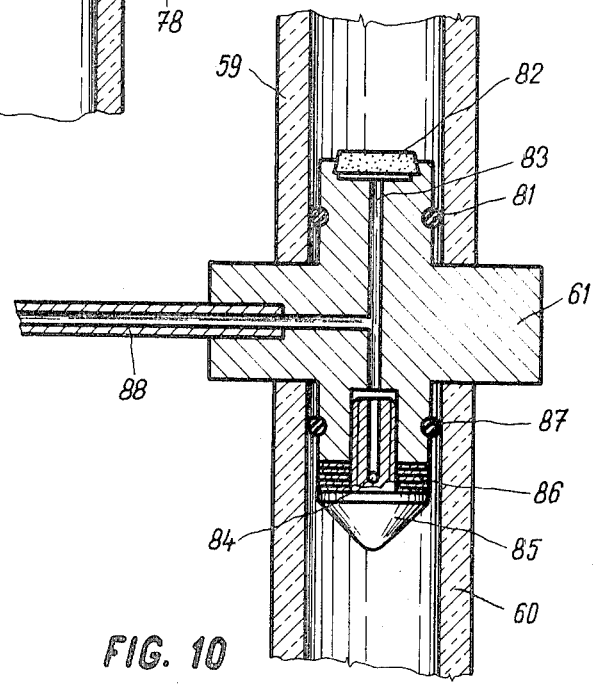
FIG. 10 is a similar view as shown in FIG. 9, showing still another modified coupling of the two tubes to each other.

Still other embodiment of the mechanical connection of the tubes 59 and 60 to each other within the bracket 61 is shown in FIG. 10. The intermediate bracket 61 is embodied in this case as a flanged body provided on its upper and lower small-diameter portions with circumferential grooves receiving elastic rings 81 and 87 e.g. silicon rubber respectively. The column tube 59 is set over said upper portion of the bracket 61 while the reactor tube 60 is set over said lower portion thereof, said rings 81 and 87 serving as tightening means. A porous plate 82 made for instance from porous polytetrafluoroethylene (TEFLON) is inserted into a recess provided in the top portion of the bracket 61, the circumferential contact area being either cylindrical, or slightly conical or dovetailed, as exaggeratively shown in FIG. 10. A minute space or plain grooving provided under the porous plate 82 cares for the communication with a central duct 83 in the intermediate bracket 61, which duct 83 communicates in turn with a channel 84 in a bolt 85 exerting a slight and uniform pressure against an annular porous body 86 constituted for example by a plurality of superposed sheets of filter paper. The reagent is supplied through a hollow needle 88 inserted radially into the intermediate bracket 61 and communicating via a radial channel with the central duct 83. It is to be understood that the intermediate bracket 61 can be used in the reverse position, or that said bracket can be provided at either side with any of the aforementioned upper seal and lower seal bodies, respectively. The upper seal body of the tube 59 or the lower seal body of the reactor tube 60 within the upper and the lower brackets 62 and 63, respectively, can be embodied according to any one of well-known modes.

It will be understood that each of the elements described above, or two or more together, may also find a useful application in other types of applications, differing from the types described above.

While the invention has been illustrated and described as embodied in the through-flow reactor, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Apparatus which is integrally connected to the outlet end of a chromatographic column for simultaneously subjecting to chemical reaction substances which have been chromatographically separated and are in the form of more or less distinct concentration gradient zones and maintaining such concentration gradient zones essentially free of distortion, wherein the apparatus comprises a tubular body having an inlet end and an outlet end opposite the inlet end, the inlet end of the tubular body connected to the outlet end of the chromatographic column, the tubular body containing a porous granular packing consisting of a material chemically inert to the chromatographically separated substances and to any of the products of the chemical reaction, the chromatographic column and the interior of the tubular body being in communication through a porous insert seated in an annular body located at the inlet end of the tubular body, the said annular body containing channels which receive a supply of a chemical reagent and which communicate with the interior of the tubular body, and porous outlet means at the outlet end of said tubular body.

2. Apparatus as defined in claim 1, wherein said porous granular packing is a substance capable of influencing catalytically the said chemical reaction.

3. Apparatus as claimed in claim 1, wherein the tubular body communicates with a manostatic device.

4. Apparatus as claimed in claim 1, wherein the porous granular packing comprises spheroidal glass particles.

5. Apparatus as claimed in claim 1, wherein the tubular body is provided with a heating device for heating the tubular body.

6. Apparatus as claimed in claim 5, wherein the heating device comprises (a) the tubular body, the tubular body being of electrically conductive material and (b) connections on at least two different portions of the tubular body to a source of electric power.

7. A through-flow reactor for a chemical reaction between substances undergoing analysis in an eluate delivered in zones having sharp concentration gradients from a chromatographic column and at least one reagent supplied in contact with the eluate at a boundary between the reactor and the column, which reactor comprises a tubular body having an inlet end for communication with the column and an outlet end, the inlet end of the tubular body housing a porous insert above and bearing on granular porous packing material and separating the chromatographic column from the granular porous packing material of the reactor and the outlet end housing a porous body below and bearing on the granular porous packing material, the granular porous packing material and the porous insert and the porous body being chemically inert to the eluate, the reagent, and the substance undergoing analysis, wherein inserted into the tubular body between said apparatus and the chromatographic column is an annular body having an inner cavity communicating with the chromatographic column and an outer annular flow space into which flow space opens a supply of a chemical reagent, the said porous insert being seated in the annular body, and connecting channels provided in said annular body connecting the annular flow space with the inner cavity of the annular body, wherein depreciation of the sharpness of the concentration gradients of the substances undergoing analysis is reduced.

8. Apparatus which is integrally connected to a chromatographic column for simultaneously subjecting to chemical reaction substances which have been chromatographically separated and are in the form of more or less distinct concentration gradient zones and maintaining such concentration gradient zones essentially free of distortion, said apparatus comprising a tubular body having an inlet end and outlet end opposite the inlet end, the tubular body containing a porous packing consisting of a material chemically inert to the chromatographically separated substances and to any of the products of the chemical reaction, the inlet end of the tubular body receiving a flowing medium carrying said chromatographically separated substances through a porous insert which is seated in an annular body, the said annular body being inserted into the tubular body between said apparatus and the chromatographic column and having an inner cavity communicating with the chromatographic column and with a supply of a chemical reagent and an outer annular flow space adjacent the inner cavity of the annular body the said outer annular flow space containing a portion of the packing and being in communication with the inner cavity of the annular body, and porous outlet means at the outlet end of the tubular body.

9. Apparatus which is integrally connected to the outlet end of a chromatographic column for simultaneously subjecting to chemical reaction substances which have been chromatographically separated and are in the form of more or less distinct concentration gradient zones and maintaining such concentration gradient zones essentially free of distortion, wherein the apparatus comprises a tubular body having an inlet end and an outlet end opposite the inlet end, the inlet end of the tubular body connected to the outlet end of the chromatographic column, the tubular body containing a porous granular packing consisting of a material chemically inert to the chromatographically separated substances and to any of the products of the chemical reaction, the chromatographic column and the interior of the tubular body being in communication through a porous insert seated in an annular body, the said annular body receiving a supply of a chemical reagent, and connecting channels provided in said annular body connecting the chemical reagent supply with the porous insert, and porous outlet means at the outlet end of the said tubular body.

* * * * *